United States Patent [19]
Patchornik et al.

[11] 3,974,110
[45] Aug. 10, 1976

[54] MODIFICATION OF POLYSTYRENE BY FRIEDEL-CRAFTS REACTION WITH SUBSTITUTED HALO ETHYL BENZENES AND HALOETHYLPHENOLS TO MAKE SUPPORTS FOR SOLID PHASE PEPTIDE SYNTHESIS

[75] Inventors: Abraham Patchornik, Ness-Ziona; Rami Kalir, Rehovot; Matityahu Fridkin, Holon; Abraham Warshavsky, Rehovot, all of Israel

[73] Assignee: Yeda Research & Development Co. Ltd., Rehovot, Israel

[22] Filed: Oct. 3, 1974

[21] Appl. No.: 511,687

[30] Foreign Application Priority Data
Oct. 4, 1973   Israel.................................. 43366

[52] U.S. Cl. .................... 260/2.5 HB; 260/47 UP; 260/79.5 NV; 260/112.5 R
[51] Int. Cl.² .................. C07C 103/52; C07G 7/00
[58] Field of Search ............... 260/79.5 NV, 47 UP, 260/2.5 HB, 112.5 R

[56] References Cited
UNITED STATES PATENTS
3,645,996   2/1972   Southard........................ 260/88.2 C
3,814,732   6/1974   Wang............................. 260/47 UP

OTHER PUBLICATIONS
Fridkin et al., — Proceedings, XXXV Meeting Israel Chem. Soc., vol. 3, 1965.
Tilak et al., — Tetrahedron Letters, No. 11, pp. 1297–1300, 1968.
Chem. Pharm. Bull., (17), (2), pp. 411–412, (1969).
Misoguchi et al., — Chem. Pharm. Bull., 18(7), pp. 1465–1474, (1970).

*Primary Examiner*—Joseph L. Schofer
*Assistant Examiner*—Peter F. Kulkosky
*Attorney, Agent, or Firm*—Browdy and Neimark

[57] ABSTRACT

A process for producing reagents useful in organic synthesis, of the general formula

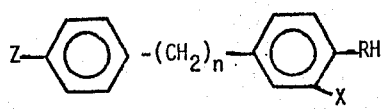

wherein
Z designates the

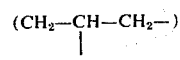

part of a polymeric backbone of a polymer like polystyrene, a copolymer comprising polystyrene and a comonomer like divinylbenzene, butadiene, and other copolymers comprising styrene, or wherein Z designates the aliphatic moiety of a long-chain aralkyl compound having a terminal phenyl moiety;
  $n$ is an integer from 1 to 8, inclusive;
  $R$ designates oxygen or sulfur;
  $X$ designates nitro, carbonyl, carboxyl, cyano-carbalkoxy or a carboxamido group which may be substituted on the nitrogen atom, or a halogen atom, or alkyl, unsaturated alkyl, aralkyl;
  $RH$ and $X$ together designate hydroxytriazole;
which comprises reacting a compound of the general formula

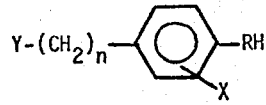

wherein $Y$ designates —Cl, —Br, or —OH and $X$ and $R$ are as defined above, with a polystyrene polymer or with a copolymer as defined above, or with a long-chain araliphatic compound as defined above, in a Friedel-Crafts reaction. According to a preferred embodiment copolymers of polystyrene and divinylbenzene are used. The invention also relates to the novel products obtained by the above reaction.

7 Claims, No Drawings

MODIFICATION OF POLYSTYRENE BY FRIEDEL-CRAFTS REACTION WITH SUBSTITUTED HALO ETHYL BENZENES AND HALOETHYLPHENOLS TO MAKE SUPPORTS FOR SOLID PHASE PEPTIDE SYNTHESIS

BACKGROUND OF THE INVENTION

The present invention relates to a process for the production of reagents useful in organic synthesis, and to the novel reagents thus produced.

STATE OF THE PRIOR ART

Various polymeric substances have been prepared hitherto which comprise certain reactive moieties attached to the polymer backbone, said functional moieties being useful for affecting various types of organic synthesis. The known polymeric reagents are prepared by either, direct polymerization of a suitable monomer incorporating the desired reactive moiety (Fridkin et al J. Amer. Chem. Soc. 88, 3164) or by activating the polymer first, as by chloromethylation, followed by insertion of the reactive moiety through substitution (E. Flanigan et al, Tet. Letts 27, 2403 (1970); R. E. Williams, J. Polymer Science A-1 10:2123) resulting in polymers, where the desired reactive moieties are bound to the backbone through weak carbon to oxygen, or carbon to sulphur, or carbon to nitrogen bonds.

The polymers produced in that way undergo, during the processes of polymerization or activation, certain nonspecified changes, such as coupling, or cross linkage or oxidation resulting in failure in performance during their application. Thus it was reported for poly-(4-hydroxy-3-nitro) styrene (M. Fridkin et al. peptides 1969, North Holand Publishing Company (1971) p-164) on failures to react the polymeric reagent to its stochiometric capacity, on release of solid particles from inside the resin pores, and on restrictions in the choice of solvent, due to failure of the polymeric reagent to swell in non polar-solvents.

SUMMARY OF THE PRESENT INVENTION

The present invention relates to a process for producing reagents useful in organic synthesis, of the general formula

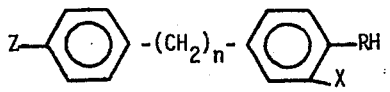

wherein
Z designates the

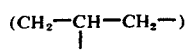

part of a polymeric backbone of a polymer like polystyrene, a copolymer comprising polystyrene and a comonomer like divinylbenzene, butadiene, and other copolymers comprising styrene, or wherein Z designates the aliphatic moiety of a long-chain aralkyl compound having a terminal phenyl moiety;
$n$ is an integer from 1 to 8, inclusive;
$R$ designates oxygen or sulfur;
$X$ designates nitro, carbonyl, carboxyl, cyano-carbalkoxy or a carboxamido group which may be substituted on the nitrogen atom, or a halogen atom, or alkyl, unsaturated alkyl, aralkyl;
$RH$ and $X$ together designate hydroxytriazole; which comprises reacting a compound of the general formula

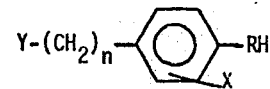

wherein $Y$ designates —Cl, —Br, or —OH and $X$ and $R$ are as defined above, with a polystyrene polymer or with a copolymer as defined above, or with a long-chain araliphatic compound as defined above, in a Friedel-Crafts reaction. According to a preferred embodiment copolymers of polystyrene and divinylbenzene are used. The invention also relates to the novel products obtained by the above reaction.

As contrasted with the known preparations for effecting organic reactions, mentioned above, the novel polymeric products of the present invention have the functional moieties attached by a stable carbon-carbon bond, in a minimum number of steps, through a reaction that activates the molecule containing the desired functional moiety, but does not activate the polymeric matric thus aiming at the least changes of the macromolecular backbone.

In that way any products of the side reactions occurring, are monomeric by nature, and could be easily washed off the polymeric reagent obtained.

Furthermore the mechanical properties of the polymeric reagents of the invention, as well as their swelling properties are excellent enabling the use of the reagent in a number of varying conditions, such as various solutions, or various temperatures, without causing any changes to the polymers. At the end of each reaction the polymer could be rapidly filtered and washed.

For comparison purposes (4-hydroxy-3-nitro) benzylated polystyrene (1) was prepared in the conventional way of reacting chloromethylpolystyrene with phenol, followed by nitration of the product.

The polymeric reagent was reddish in appearance, and did not decolorize on acylation; it released particles, and upon standing showed signs of oxidation. In contrast with the polymer prepared by this invention, which showed the typical yellow colour of the nitrophenol, turning colourless upon acylation; the two polymeric reagents were compared by testing their coupling with various N-blocked amino acids by the dicyclohexylcarbodiimide (DCC) method as shown below:

N-blocked amino acids esters of (4-hydroxy-3-nitro) benzylated polystyrenes I and II.

Capacity of resins I and II; 2.2 mmoles per gram
Residue bound to polymer

|  | mmoles of amino acid bound per gram of resin | |
| --- | --- | --- |
|  | I | II |
| Z-phe | 0.3–0.6 | 1.17 |
| Z-gly | 0.5–0.7 | 1.40 |
| Z-ala | 0.48 | 1.20 |
| Boc-leu | 0.3 | 1.27 |

The novel polymeric reagents of the present invention are of the general formula:

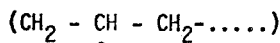
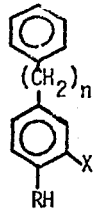

wherein:

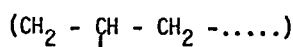

designates the polymer backbone of a polymer like polystyrene or a copolymer comprising polystyrene - divinylbenzene, or the like:
$n$ is an integer, (1 to 8)
$R$ designates oxygen or sulfur;
$X$ designates a nitro, carbonyl, carboxyl, cyano-carbalkoxy or carboxamide group, which latter may be substituted on the $n$ nitrogen atom, or a halogen atom, or alkyl, unsaturated alkyl or aralkyl.

The invention will be illustrated with reference to polymers prepared by the use of a halomethyl group. These are representative for a variety of halo-alkyl groups and the invention is by no means restricted to the specific groups illustrated.

The acidic nature of the —OH or —SH group is further enhanced by the additional substituent or substituents —X, the preferred position of these being the ortho- or para-position.

The novel polymeric reagents of the present invention are prepared by reacting a group of the general formula.

(Bearing in mind that polycondensed aromatic systems carrying the same substituents, RH, X and CH$_2$-Y could be similarly used)

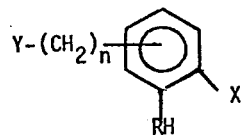

wherein $Y$ designates —Cl, —Br, or —OH, with a suitable polymer such as polystyrene, copolymer of styrene with other suitable monomers, such as divinylbenzene, butadiene; substituted polystyrene, etc. The polymer may be in any desired physical form or shape, suitable for the intended purpose: gel-type, macroreticular, isoporous, popcorn; bead-form or the like. The novel polymeric reagents are characterized by exceptional physical stability, and thus they can be used repeatedly without undergoing any appreciable changes of form. This is contrasted with many of the previously prepared polymeric reagents which tended to disintegrate and crumble to a powder.

According to a modification of the present invention instead of the rigid polymeric backbone there is used a long-chain compound having a terminal phenyl group, which is used in the same manner as the phenyl moiety of the styrene polymer for attachment of functional groups of the type defined above resulting in a similar

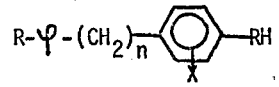

structure. The reaction of the haloalkyl-substituted-phenyl moiety and the sytrene polymer or aralkyl compound are affected by means of a Friedl-Crafts reaction, resulting, as pointed out above, in a stable carbon-carbon bond.

According to a further modification of the invention the functional moiety attached to the phenyl group of the polymer or of the long-chain araliphatic compound may be of the type

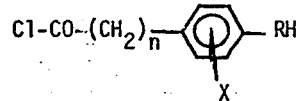

resulting in a grouping

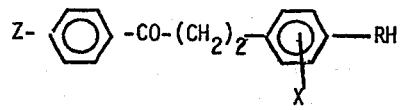

Wherein the substituents are as defined and Z is the

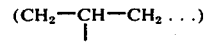

part of the polymeric backbone or the aliphatic part of the long-chain compound.

The active phenolic or thiophenolic reagents according to the present invention are active towards acids and yield rapidly and in a quantitative manner the corresponding active esters. Esters of the following were prepared: carboxylic acids, N-blocked amino acids, phosphoric acids, sulfonic acids, carbonic acids. The active esters were used for affecting acylations such as N-acylations, O-acylations, C-acylations. Reacting active phosphor or sulfur esters with amines results in the formation of the corresponding phosphor-amides and sulfonamides. The phosphorylation of an alcohol was carried out by reacting the active phosphate with an excess of alcohol in pyridine at reflux temperature. The reaction of sulfhydryl compounds with active esters results in the corresponding thioesters.

The novel reagents according to the present invention constitute effective and versatile means for affecting a wide range of organic reactions. The polymeric reagent is filtered off at the end of the reaction, and the product is easily separated. The polymeric reagents are easily regenerated and can be used repeatedly.

The invention is described by the following examples, which are to be constructed in a non-limitative manner.

It is clear that various modifications and changes in the nature of the reactants, conditions of the reaction and proportions can be resorted to without departing from the scope and spirit of the present invention.

DESCRIPTION OF THE PREFERRED EMBODIMENT

Example 1

(4-Hydroxy-3-nitro) benzylated Polystyrene

A quantity of 42.0 gr (0.22 moles) 4 hydroxy-3 nitrobenzylchloride in 300 ml nitrobenzene was stirred with 70.0 gr dried copolystrene-2-divinylbene and the stirred mixture was heated gradually to 65°–70°C. 20 ml of a 1.8 molar solution in nitrobenzene of aluminum chloride was added. The reaction mixture became deep red and hydrogen chloride evolved. Stirring was continued at 65°–70°C until evolution of hydrogen chloride ceased (after about 48 hours), the polymer was filtered off, washed with chloroform (2000 ml) 1N HCl in dioxane/water (7:3, v/v; 400 ml), dioxane (2000 ml), methanol (1000 ml) and finally dried in vacuo at 80°C. The product (104.0 gr) contained 1.95 mmoles N/g indicating that approximately 30% of the aromatic rings of the polymer were substituted.

The example was repeated at varying ratios of aluminum chloride to 4-hydroxy-3-nitro-benzyl chloride. The results are given in Table 1.

Example 2

(4-Hydroxy-3-nitro) benzylated Polystyrene (Macroreticular type)

A run was affected as in Example 1, but 70 g macroreticular copolystyrene-divinylbenzene (Type XE-305, Rohm & Haas) was used. Similar results as regards contents of substituted groups were obtained.

Example 3

(4-Hydroxy-3-Nitrobenzylated polystyrene conventional type, produced by polymer activation)

100 gr of chloromethylpolystyrene (2% D.V.B. cross linked) were stirred in a refluxing solution of 500 gr of freshly distilled phenol and 500 ml of dry, freshly distilled dichloroethylene in presence of 0,25 gr of dry $ZnCl_2$ for 96 hours.

The product was filtered, washed with 2 liters of dichloroethane, 0,03 N HCl in dioxum solution, 2 liters of water, and 2 liters of methanol. The product was dried under vacuo at 100°C.

Weight: 118 gr.

50 gr of the product were nitrated in 500 ml of 64% nitric acid at room temperature for 5 hours. The mixture was poured on ice, and the polymer, filtered and washed with water, dioxan and dimethyl formamide.

The dry product weights 58 gr, analysis 3.07% N.

Example 4

Reaction with —chloro-t-butylbenzene.

A run was affected as in Example 1, but 30,6 gr (0.2 mmoles) of 4-hydroxy-3-nitro- -chloro-t-butylbenzene was used with similar results.

Example 5

A run was affected as in Example 1 but 35.2 gr (0.2 mmoles) of 1-chloromethylnaphtalene was used, with similar results.

Example 6

(4-Hydroxy-3-acetyl) benzylated Polystyrene

To a solution of 1.8 gr aluminum chloride in 100 ml nitrobenzene was added a quantity of 2 gr XE-305 polystyrene (Rohm & Haas); the mixture was stirred at 65°C and a solution of 1.8 gr 2-acetyl-4-chloromethyl phenol in 100 ml nitrobenzene was added dropwise during 48 hours. After an additional 20 hours the polymer was poured on hydrochloric acid (2N), filtered, washed with methanol, water, methanol and dried. 2.4 of the desired product (1 mmole/g) was obtained, IR absorption at 1640 (KBr).

DNP derivative: 4.8% N

Example 7

(2,6-Dichloro-4-acetyl-3-hydroxy and 2,4-dichloro-5-hydroxy-6-acetyl) benzylated polystyrene To a solution of 1.7 gr $AlCl_3$ in 10 ml nitrobenzene there was added 2.3 gr chloromethyl-2,4-dichloro-6-acetyl phenol (isomeric mixture) and 2 gr XE-305 (macroreticular, Rohm & Haas). The reaction mixture was maintained at 70°C for 48 hours, poured on 6 M HCl and the resin was filtered off, washed with methanol, water, methanol and dried at 80°C.

A crop of 2.35 gr was obtained.

Example 8

(2-formyl-4-hydroxy) benzylated polystyrene 1.4 g of 2-formyl-4-chloromethyl-phenol (p-chloromethyl-salicy aldehyde) were reacted with 2 g XE-305 in 6 ml of 1.8 M aluminum chloride in nitrobenzene. The reaction was carried out at 70°C for 3 hours. The resin was filtered off, washed with 6 M HCl, methanol, water, methanol and dried at 80°C. A crop of 2.9 g of the desired product was obtained.

DNP derivative: 6.6 % N

Example 9

(3-Nitro-4-hydroxy) benzylated dodecyl benzene 6.2 g (25 mmole) dodecylbenzene and 5.7 g (30 mmole) of 4-chloromethyl-2-nitro-phenol and 3.6 mmole aluminum chloride in 22 ml nitrobenzene were reacted at 70°C for 20 hours, the reaction mixture was cooled and poured on 20 ml concentrated hydrochloric acid. The excess of nitrobenzene was steam-distilled distilled and the oily residue was extracted with hexane. After washing with water the product was isolated in the form of an oily substance, crop: 8.9 g. The structure was confirmed by proton magnetic resonance spectra.

In the same manner 3-nitro-4-hydroxy benzylated cyclododecyl benzene was prepared. (2.8 % N)

Example 10

3,4-dimethoxy-6-nitro- benzylated polystyrene 25 gr of polystyrene (2% copolymer with D.V.B.) were reacted with 15 gr 3,4-dimethoxy-6-nitro benzylchloride in 100 ml nitrobenzene in presence of 5 ml of 1.8 M $AlCl_3$ in nitrobenzene for 24 hours at room temperature. The polymer was filtered, washed with chloroform, dioxan:HCl (1:1), dioxan, methanol and dried. 36 gr; 2.03 % Nitrogen.

Example 11

4-(3'-methylene pyridine) polystyrene 1.2 gr of 3-pyridylcarbinal (10 mmoles) in 15 ml of 1.8 molar $AlCl_3$ in nitrobenzene, were reacted with 2 gr of polystyrene (XE-305, Rohm & Haas) at 80°C for 3 days. The polymer was filtered, washed with methanol:HCl, (1:1), methanol and dried. 2.6 g of 2.4 % Nitrogen content.

Example 12

Reaction with 2-nitro-4-methyloldisulfide.

3 gr of the disulfide (prepared from 3-nitro-4-chlorobenzyl alcohol and sodium disulfide) were reacted with 5.3 gr of polystyrene (XE-305) in presence of 10 ml 1.8 M AlCl$_3$ in nitrobenzene at 70°C for 48 hours. The product was filtered, treated as in Example 2 of 1.55% sulfur content.

Example 13

Preparation of Benzhydroxytriazole Polymer.

Stage A 10 g of XE-305 polystyrene were added to 13 g 3-nitro-4- chlorobenzyl alcohol and 10 g aluminum chloride in 50 ml benzene. The reaction mixture was left at 70°C for 3 days, poured on ice-water washed with methanol, hydrochloric acid (IN), methanol, and dioxan and the product was dried. There was obtained 14.3 g of a colorless polymer containing 7.0 % chlorine.

Stage B 10 g of the product of Stage A were refluxed in 40 ml hydrazine hydrate (98%) and 60 ml 2-ethoxyethanol. The reflux was effected during 1 hour and after this period the polymer was filtered off, washed with water, with dioxan, methanol, ether, and dried. The product contains 0.4 % Cl, and 5.4 % nitrogen.

Stage C

The product of Stage B was mixed with 50 ml concentrated hydrochloric acid and 50 ml dioxane and stirred at room temperature for 20 hours. The polymer was filtered off, washed with water, dioxan, methanol, ether and dried. The desired benzhydroxytriazole polymer (BHT) was obtained in quantitative yield. Nitrogen content: 5,2%.

Table 1

Preparation of (4-hydroxy 3-nitro) benzylated polystyrene at different 4-hydroxy-3-nitrobenzyl chloride to aluminum chloride ratios.

| mmoles of 4-hydroxy-3-nitrobenzyl chloride used per gram polystyrene[a] | mmoles of AlCl$_3$ used per gram polystyrene[b] | mmoles of nitrophenol per gram PHNB |
|---|---|---|
| 0.77 | 0.90 | 0.70 |
| 1.05 | 0.90 | 0.90 |
| 2.10 | 0.36 | 1.10 |
| 2.10 | 0.90 | 1.17 |
| 2.10 | 1.80 | 1.27 |
| 2.10 | 0.90 | 1.33 |
| 4.20 | 0.90 | 2.14 |
| 6.30 | 0.90 | 2.70 |

[a]Reactions were carried out on samples of 2 g of polystyrene in 12 ml of nitrobenzene during 48 hours.
[b]1.8 molar solution of AlCl$_3$ in nitrobenzene was employed.

We claim:

1. A process for producing reagents useful for effecting reactions of organic synthesis, of the general formula

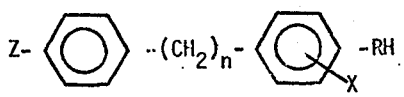

wherein
Z designates the

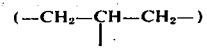

part of a polymeric backbone of a polymer like polystyrene, a copolymer comprising polystyrene and a comonomer like divinylbenzene, butadiene and other copolymers comprising styrene;
$n$ is an integer from 1 to 8, inclusive;
$R$ designates oxygen or sulfur;
$X$ designates nitro, carbonyl, carboxyl, cyano-carbalkoxy or a carboxamido group which may be substituted on the nitrogen atom, or a halogen atom, or alkyl, unsaturated alkyl, aralkyl;
or where $RH$ and $X$ together designate hydroxytriazole which comprises reacting a compound of the general formula

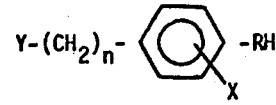

wherein $Y$ designates —Cl, —Br, or —OH, and $X$ and $R$ are as defined above, with a polystyrene polymer or polystyrene containing copolymer in a Friedel-Crafts reaction.

2. A process according to claim 1, wherein the polymer is polystyrene or a copolymer of polystyrene and divinylbenzene.

3. A process according to claim 1, wherein the Y-(CH$_2$)$_n$-group is a chloromethyl group.

4. A modification of the process according to claim 1, wherein the compound reacted with the polymer of the formula

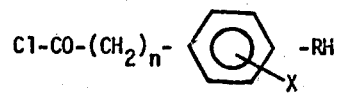

and the product is of the general formula

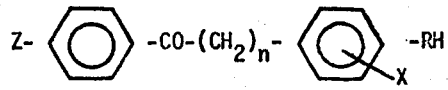

wherein $R$, $X$, $Z$ and $n$ have the meaning as defined in claim 1.

5. A process according to claim 1, wherein the polymer is in the form of a gel-type, microreticular, macroreticular isoporous or popcorn type polymer.

6. A process according to claim 5, wherein the polymer is in bead form.

7. A process according to claim 5, wherein the polymer is in sheet form and the product is a membrane.

* * * * *